(12) United States Patent
Shen et al.

(10) Patent No.: US 8,223,502 B2
(45) Date of Patent: Jul. 17, 2012

(54) CHIP CARD HOLDER AND ELECTRONIC DEVICE USING THE SAME

(75) Inventors: Jun Shen, Shenzhen (CN); Hai-Feng Zhu, Shenzhen (CN); Ping Gao, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 301 days.

(21) Appl. No.: 12/713,265

(22) Filed: Feb. 26, 2010

(65) Prior Publication Data

US 2011/0157840 A1 Jun. 30, 2011

(30) Foreign Application Priority Data

Dec. 25, 2009 (CN) .......................... 2009 1 0312292

(51) Int. Cl.
*H05K 1/00* (2006.01)
*H05K 1/18* (2006.01)
*H05K 7/00* (2006.01)

(52) U.S. Cl. ........................................ 361/748

(58) Field of Classification Search .................. 361/807, 361/810, 756, 727, 731; 439/945, 946
See application file for complete search history.

(56) References Cited

U.S. PATENT DOCUMENTS

| | | | | |
|---|---|---|---|---|
| 6,142,793 | A * | 11/2000 | Schremmer et al. | 439/76.1 |
| 6,422,469 | B1 * | 7/2002 | Pernet | 235/486 |
| 6,437,987 | B1 * | 8/2002 | Lin | 361/756 |
| 6,529,386 | B2 * | 3/2003 | Boe | 361/801 |
| 7,682,178 | B2 * | 3/2010 | Feng | 439/326 |
| 2004/0190265 | A1 * | 9/2004 | Shaie | 361/719 |
| 2007/0236906 | A1 * | 10/2007 | Hsu | 361/810 |
| 2008/0316719 | A1 * | 12/2008 | Huang | 361/756 |
| 2009/0241303 | A1 * | 10/2009 | Zhu | 24/591.1 |
| 2009/0267677 | A1 * | 10/2009 | Myers et al. | 327/356 |
| 2010/0055948 | A1 * | 3/2010 | Zuo | 439/152 |
| 2010/0103593 | A1 * | 4/2010 | Chang et al. | 361/679.01 |
| 2010/0112838 | A1 * | 5/2010 | Liu | 439/133 |
| 2010/0134988 | A1 * | 6/2010 | Zheng et al. | 361/756 |
| 2010/0157563 | A1 * | 6/2010 | Llapitan et al. | 361/807 |

* cited by examiner

*Primary Examiner* — Lisa Lea Edmonds
*Assistant Examiner* — Xanthia C Cunningham
(74) *Attorney, Agent, or Firm* — Altis Law Group, Inc.

(57) ABSTRACT

A chip card holder is configured for receiving a chip card. The chip card holder includes a housing defining a groove, a latching part received in the groove, a fixing element made of rubber material. The chip card is received in the latching part. The fixing element includes a main plate, a positioning portion, a rib, and a free end. The positioning portion is positioned on a side of the main plate. The positioning portion latches the housing. The rib is positioned on the same side which positioning the positioning portion. The rib resists the chip card. The free end extends from a peripheral edge of the main plate. The present disclosure further discloses an electronic device using the chip card holder.

10 Claims, 4 Drawing Sheets

CHIP CARD HOLDER AND ELECTRONIC DEVICE USING THE SAME

BACKGROUND

1. Technical Field

The present disclosure generally relates to chip card holders, and particularly to chip card holders used in electronic devices.

2. Description of Related Art

A typical SIM card holder for holding a SIM card to a main body of an electronic device, includes a latching groove defined in the main body. A connector, including a plurality of contacts, is set in the middle of the latching groove. The shape and size of the latching groove correspond to the dimensions of a SIM card. In use, the SIM card is received in the latching groove and the contacts electronically connect to the SIM card. A part of the SIM card is exposed from the latching groove. The SIM card can be released when a user's finger slides it away from the latching groove by a friction force between the finger and the SIM card. However, it can be inconvenient to remove a SIM card from the latching groove.

Therefore, there is a room for improvement within the art.

BRIEF DESCRIPTION OF THE DRAWINGS

Many aspects of a chip card holder and electronic device using the same can be better understood with reference to the following drawings. The components in the drawings are not necessarily to scale, the emphasis instead being placed upon clearly illustrating the chip card holder and electronic device using the same. Moreover, in the drawings, like reference numerals designate corresponding parts throughout the several views.

DETAILED DESCRIPTION

Figure 1:
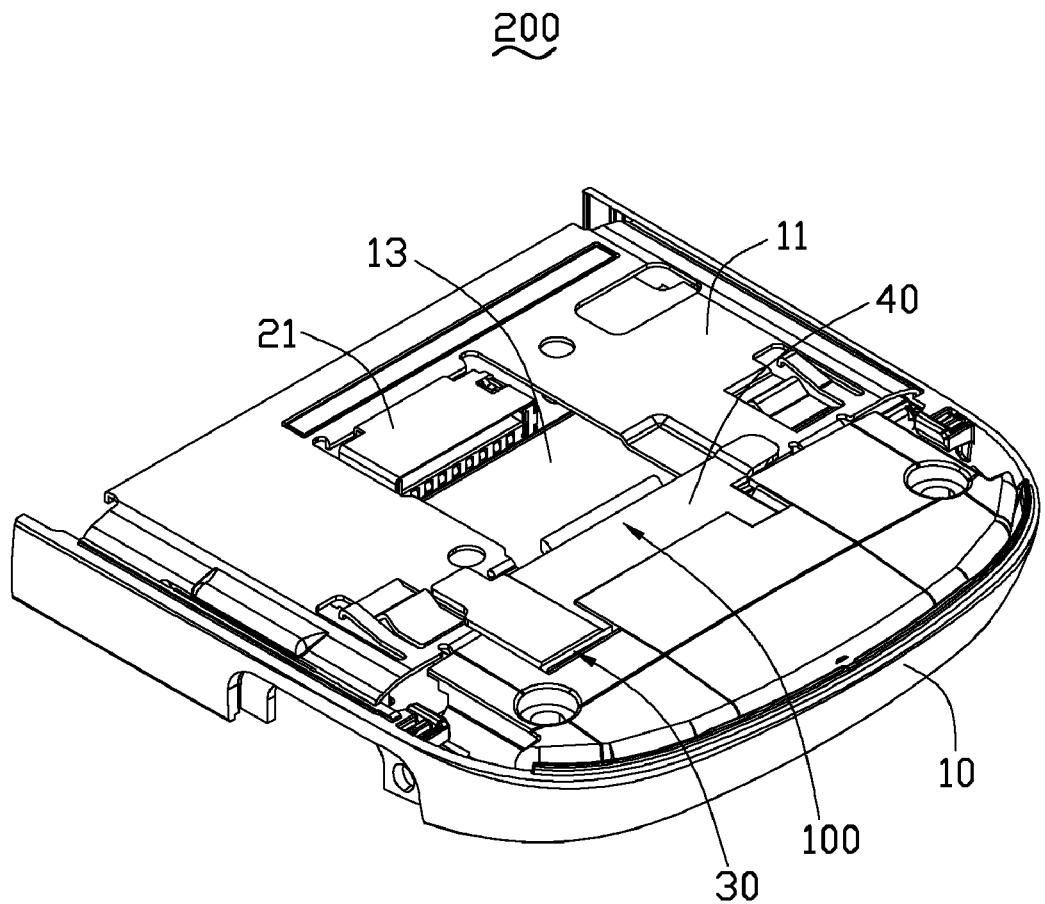
FIG. 1 is an assembled, isometric view of an exemplary chip card holder used in an electronic device.
Figure 4:
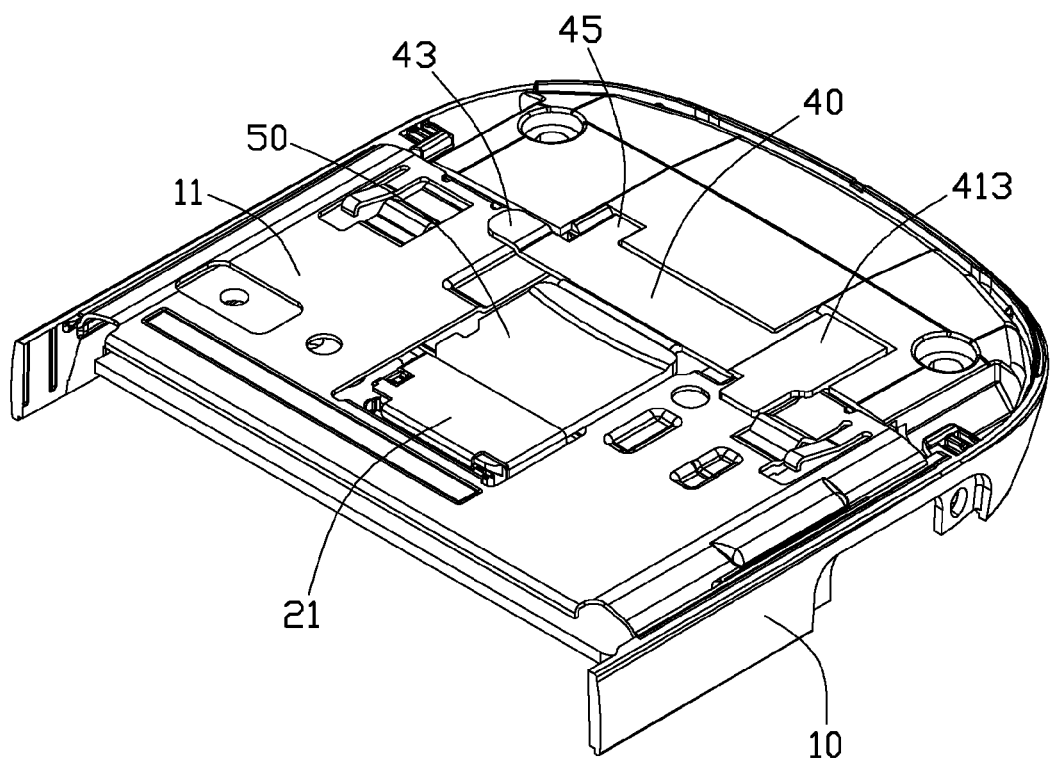
FIG. 4 is an assembled, isometric view of a chip card latched in the chip card holder shown in FIG. 1.

FIG. 1 and FIG. 4 show an exemplary embodiment of a chip card holder 100 for use in an electronic device 200, such as mobile phone, personal digital assistant, and so on. The chip card holder 100 holds chip card 50 in place.

Figure 2:
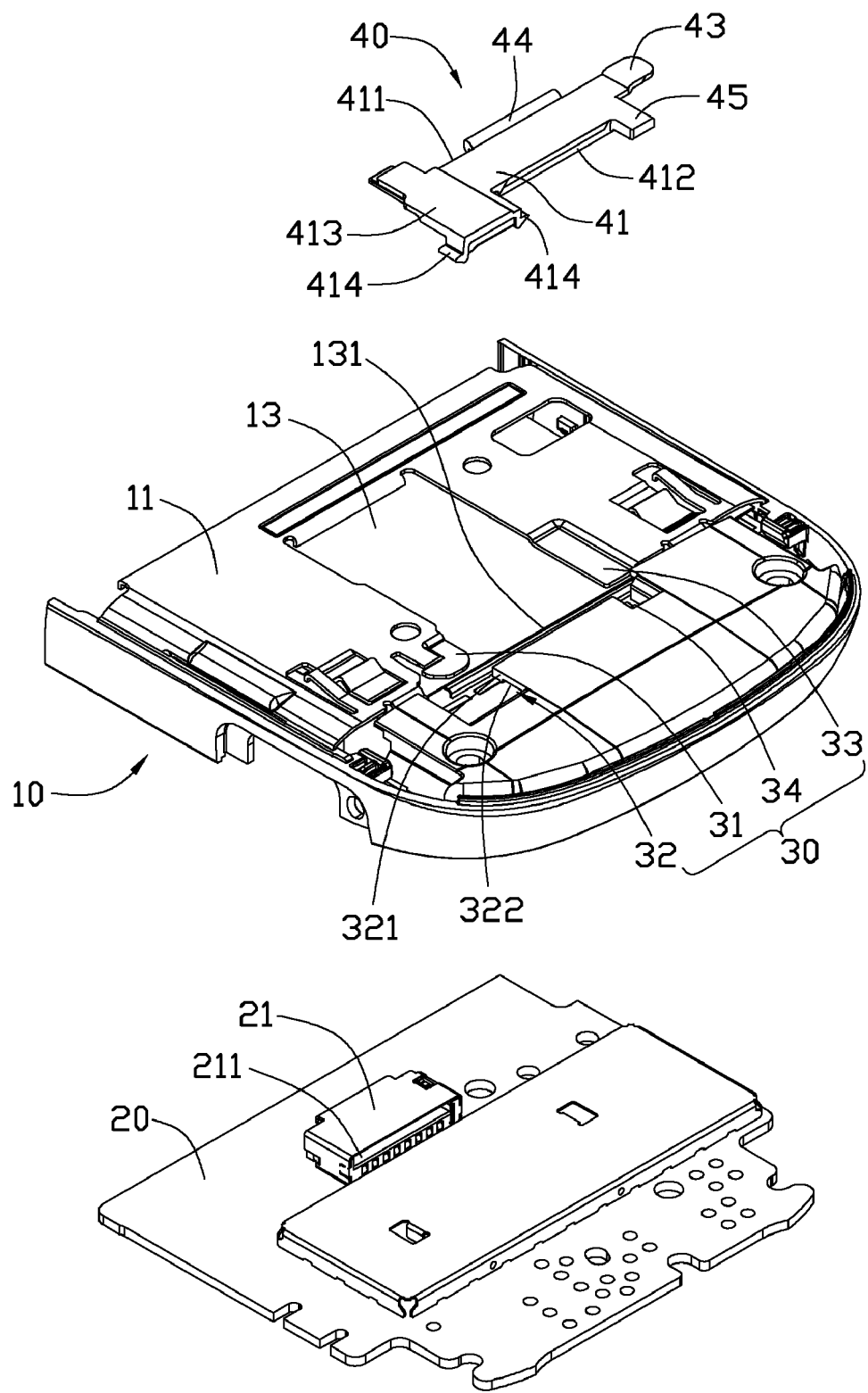
FIG. 2 is an exploded, isometric view of the exemplary chip card holder shown in FIG. 1.

Referring to FIG. 2, the chip card holder 100 includes a housing 10, a printed circuit board 20, and a fixing element 40. The housing 10 may be portions of the electronic device 200 and includes a panel 11. The panel 11 defines a groove 13 for receiving the chip card 50 and forms an end wall 131. The printed circuit board 20 is disposed at one side of the housing 10. The printed circuit board 20 includes a latching part 21 aligned with the groove 13. The latching part 21 can be substantially rectangular, and is engageable in the groove 13. The latching part 21 defines a receiving slot 211 for receiving one end of the chip card 50.

The housing 10 forms a latching portion 30 adjacent to the groove 13. The latching portion 30 includes a latching plate 31, a recessed portion 33, and a latching chamber 34. The latching plate 31 is formed at one side of the groove 13. The latching plate 31 is a part of the panel 11, and is formed into an arch-shaped plate. A latching slot 32 is defined in the panel 11 adjacent to the latching plate 31, and includes two opposite sidewalls 321. Each of the sidewalls 321 defines a recessed slot 322. The recessed portion 33 is formed at the other side of the groove 13. The latching chamber 34 is defined in the panel 11 aligned with the recessed portion 33.

Figure 3:
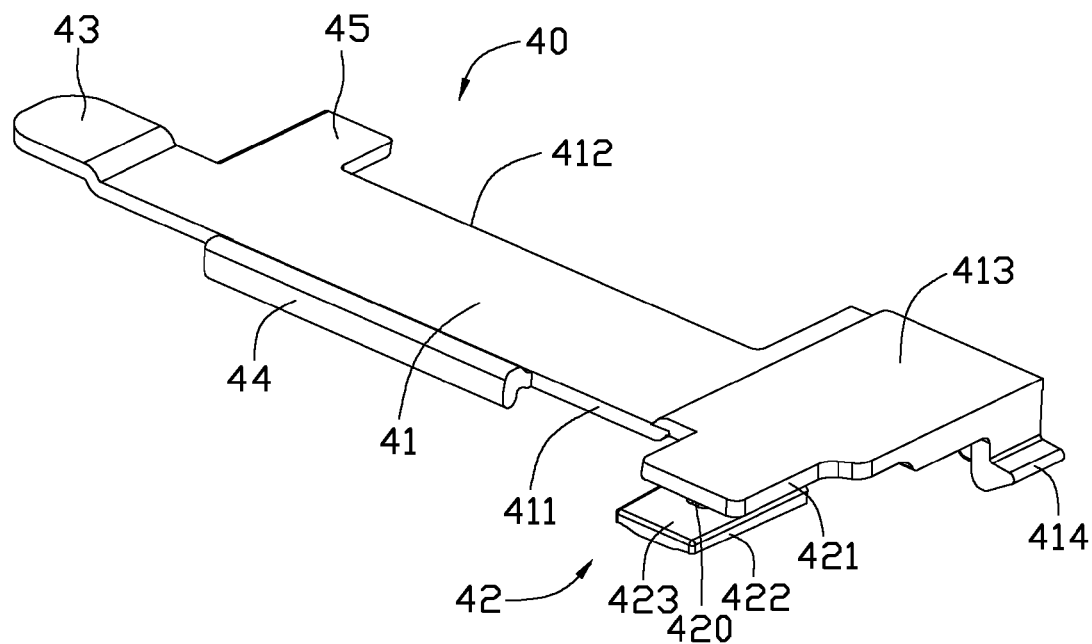
FIG. 3 is an isometric view of a holder structure of the exemplary chip card holder.

Referring to FIG. 3, the fixing element 40 may be made of rubber material, such as thermoplastic urethane (TPU). The fixing element 40 includes a main plate 41, a positioning portion 42, a free end 43, a rib 44, and a block 45.

The main plate 41 can be resiliently bent by an external force, and rebounds when the external force is released. The main plate 41 includes a first end 411, a second end 412 opposite to the first end 411, and a fixing portion 413. The fixing portion 413 connects to an end of the main plate 41. Two hooks 414 extend from two opposite sides of the fixing portion 413 adjacent to the second end 412. The hooks 414 can detachably engage the recessed slot 322. The positioning portion 42 includes a first plate 421 and a second plate 422 extending from the fixing portion 413. The first plate 421 connects to the second plate 422 with a post 420. The first plate 421 and a second plate 422 are spaced from each other in parallel, and define a latching space 423.

The free end 43 perpendicularly extends from a peripheral edge of the main plate 41 opposite to the fixing portion 413 and extends parallel to the main plate 41. The rib 44 is positioned on the first end 411 for resisting the chip card 50. The block 45 perpendicularly extends from the first end 411 adjacent to the free end 43.

In assembly, the fixing portion 413 latches in the latching slot 32, and the latching plate 31 is detachably received in the latching space 423. The hooks 414 engage in the recessed slot 322. The block 45 is received in the latching chamber 34. The second end 412 resists the end wall 131, and the first end 411 faces the receiving slot 211. The main plate 41 is partially received in the recessed portion 33.

When the chip card 50 is assembled to the receiving slot 211, a user can manipulate the free end 43, causing the main plate 41 to bend enough to release the fixing portion 413 from the housing 10. Thus, the receiving slot 211 is exposed from the groove 13. The chip card 50 can be inserted into the receiving slot 211. When the user releases the free end 43, the main plate 41 rebounds, and the rib 44 resists the chip card 50.

The chip card holder 100 has a simple structure, and the fixing element 40 has flexibility. Thus, the fixing element 40 will keep the card in place until manipulated by a user which then easily releases the chip card 50.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A chip card holder for receiving a chip card, the chip card holder comprising:
    a housing defining a groove and forming a latching portion adjacent to the groove;
    a fixing element for attachment to the latching portion, the fixing element comprising:
        a main plate;
        a positioning portion positioned on a side of the main plate for latching to the latching portion of the housing;
        a rib extending from the positioning portion for resisting the chip card; and a free end extending from a peripheral edge of the main plate;

wherein the main plate comprises a fixing portion connecting to an end of the main plate opposite to the free end; the positioning portion extends from the fixing portion, the positioning portion comprises a first plate and a second plate connecting to the first plate with a post.

2. The chip card holder as claimed in claim 1, wherein the first plate and a second plate are spaced from each other in parallel, and define a latching space; the housing comprises a latching plate detachably received in the latching space.

3. The chip card holder as claimed in claim 2, wherein the fixing portion comprises two hooks extending from two opposite sides thereof, the hooks detachably latch the housing.

4. The chip card holder as claimed in claim 3, wherein the housing defines a latching slot aligned with the latching plate; the hooks detachably latch the latching slot.

5. The chip card holder as claimed in claim 1, wherein the fixing element further comprises a block perpendicularly extending from the main plate opposite to the rib; the housing defines a latching chamber, the block latches the latching chamber.

6. An electronic device, comprising:
   a housing defining a groove and forming a latching portion;
   a chip card holder for holding a chip card, the chip card holder comprising:
      a latching part received in the groove, one end of the chip card received in the latching part; and
      a fixing element for attachment to the latching portion, the fixing element comprising:
         a main plate;
         a positioning portion positioned on a side of the main plate, and for latching to the latching portion of the housing;
         a rib extending from the positioning portion for resisting another end of the chip card; and
         a free end extending from a peripheral edge of the main plate;
      wherein the main plate comprises a fixing portion connecting to an end of the main plate opposite to the free end; the positioning portion extends from the fixing portion, the positioning portion comprises a first plate and a second plate connecting to the first plate with a post.

7. The electronic device as claimed in claim 6, wherein the first plate and the second plate are spaced from each other in parallel, and define a latching space; the housing comprises a latching plate detachably received in the latching space.

8. The electronic device as claimed in claim 7, wherein the fixing portion comprises two hooks extending from two opposite sides thereof, the hooks detachably latch the housing.

9. The electronic device as claimed in claim 8, wherein the housing defines a latching slot aligned with the latching plate; the hooks detachably latch the latching slot.

10. The electronic device as claimed in claim 6, wherein the housing defines a latching slot aligned with the latching plate; the hooks detachably latch the latching slot.

* * * * *